(12) United States Patent
Voles

(10) Patent No.: US 6,888,492 B1
(45) Date of Patent: May 3, 2005

(54) RADAR

(75) Inventor: Roger Voles, Chiswick (GB)

(73) Assignee: Thorn Emi Electronics Limited, Hayes (GB)

( * ) Notice: Subject to any disclaimer, the term of this patent is extended or adjusted under 35 U.S.C. 154(b) by 1826 days.

(21) Appl. No.: 07/163,567

(22) Filed: Jan. 15, 1988

(30) Foreign Application Priority Data

Jan. 19, 1987 (GB) .............................................. 8701088

(51) Int. Cl.$^7$ .............................................. G01S 13/00
(52) U.S. Cl. ....................................................... 342/90
(58) Field of Search .......................... 342/90, 159, 192, 342/85, 83

(56) References Cited

U.S. PATENT DOCUMENTS 3,728,724 A * 4/1973 Alpers
3,745,578 A * 7/1973 Barrett, Jr. et al.
3,772,689 A * 11/1973 Root, Jr.
3,896,434 A * 7/1975 Sirven
4,622,555 A * 11/1986 Doggett et al.
4,743,910 A * 5/1988 Hill et al.

* cited by examiner

Primary Examiner—Mark Hellner
(74) Attorney, Agent, or Firm—Crowell & Moring LLP

(57) ABSTRACT

A radar for a terminally-guided sub-munition is capable of differentiating between spatial depositions of target scatterers and clutter. The radar frequency f is swept, in stepwise manner, over a frequency range F, the frequency of 2N successive batches of M pulses being incremented in steps of $$f = \frac{F}{2N}.$$

To minimise variability of hybrid spectrum with relative target velocity, v, a duplexer transmits the 2 NM pulses with a monotonic frequency sequence derived from control circuit and the returns being reordered.

8 Claims, 5 Drawing Sheets

(d)

RADAR

This invention relates to a radar and it relates especially, though not exclusively, to a radar used in a terminally-guided sub-munition (TGSM) operating in search and tracking modes.

There has arisen a need to improve the performance of a non-coherent pulsed radar for the detection and tracking of targets, such as tanks or trucks in a background of clutter.

Accordingly there is provided a radar comprising means for transmitting radar pulses in successive groups and for receiving corresponding returns, the pulses in each group being transmitted in accordance with a respective monotonic sequence of frequencies, each said sequence being different from at least one other sequence, transformation means to derive from said returns a plurality of transformation signals representing a distribution of pairs of scatterers, which comprise target and or clutter, as a function of their differential range, means to order said returns in accordance with a single monotonic sequence of said transmitted frequencies before they are passed to said transformation means, and comparison means for comparing the power in a selected one or a selected group of differential range cells with a threshold value thereby to enable detection of a target.

A radar in accordance with this invention, wherein pulses are transmitted in accordance with respective monotonic sequences of frequencies is beneficial in affording useful protection against electronic counter measures.

In an embodiment of the invention the frequencies in each said sequence interleave with the frequencies in another said sequence and, in particular, the frequencies in each said sequence may interleave with the frequencies in the immediately preceding and or succeeding sequence.

A batch of interleaved sequences (containing 2N frequencies say) may be repeated a number of times (M, say), there being a total of 2 NM transmitted pulses.

Alternatively, each frequency may be transmitted M times in succession or each sequence may be transmitted M times in succession.

The frequencies from which the sequences are constituted may be evenly spaced and the monotonic sequences may be increasing or decreasing sequences or a mixture of both.

Figure 1:
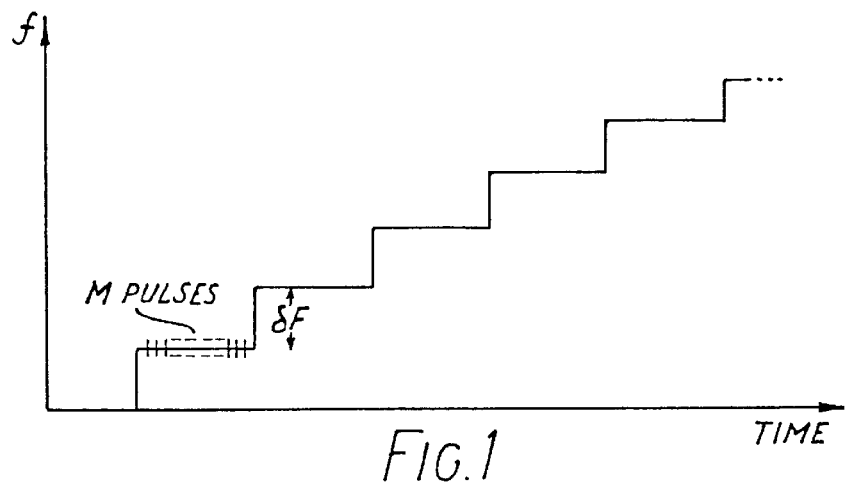
Figure 2:
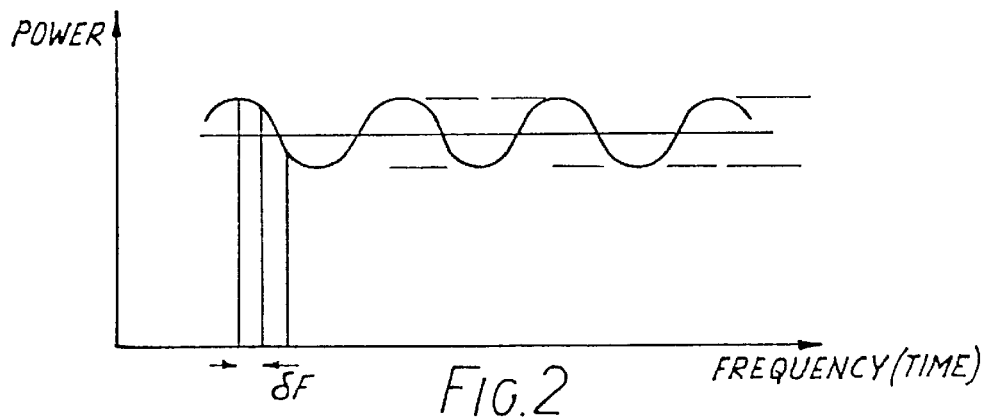
Figure 3:
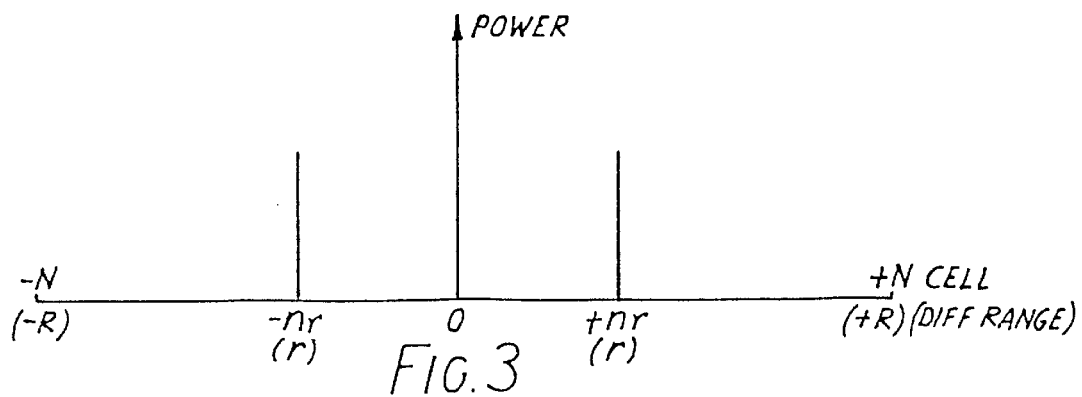
Figure 4:
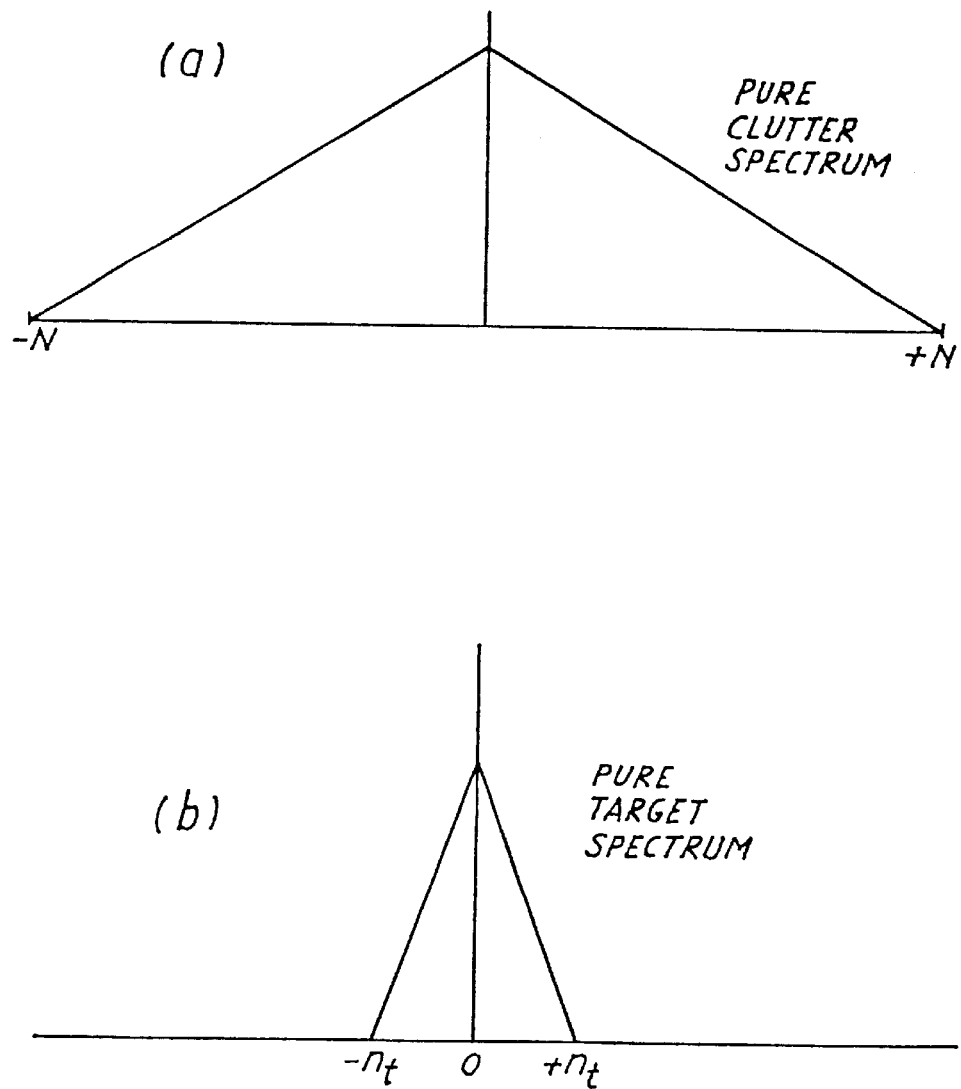
Figure 4C:
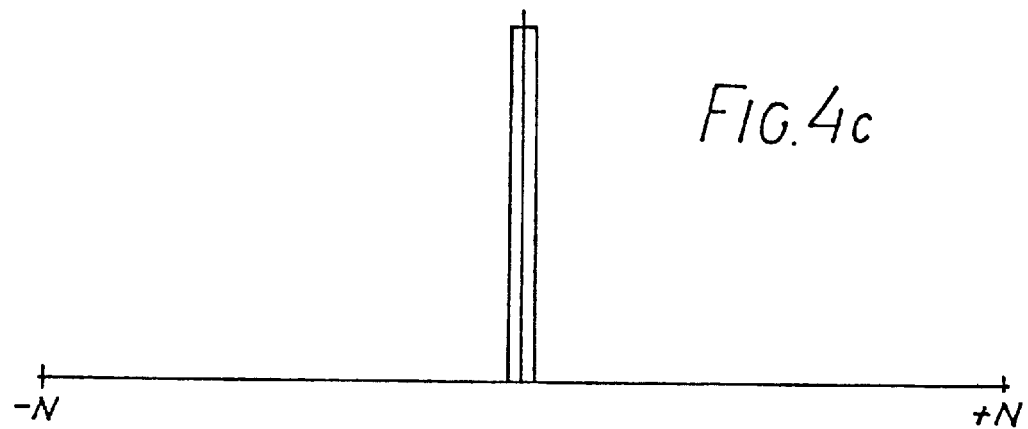
Figure 5:
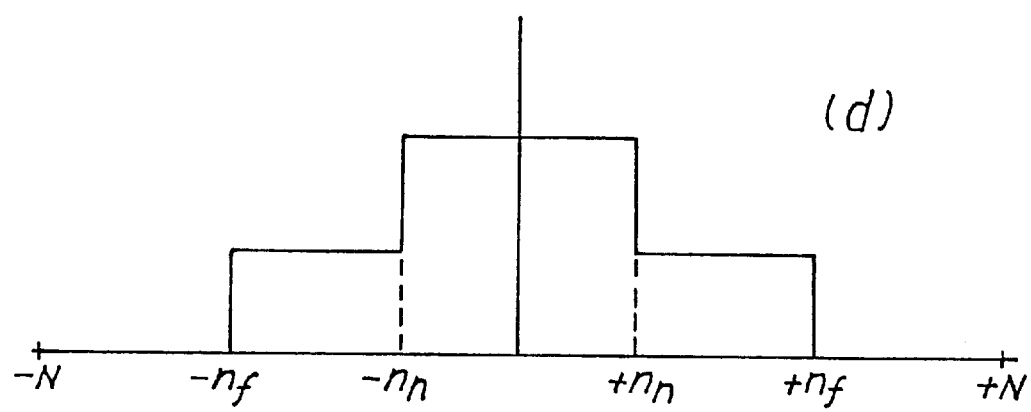
Figure 5:
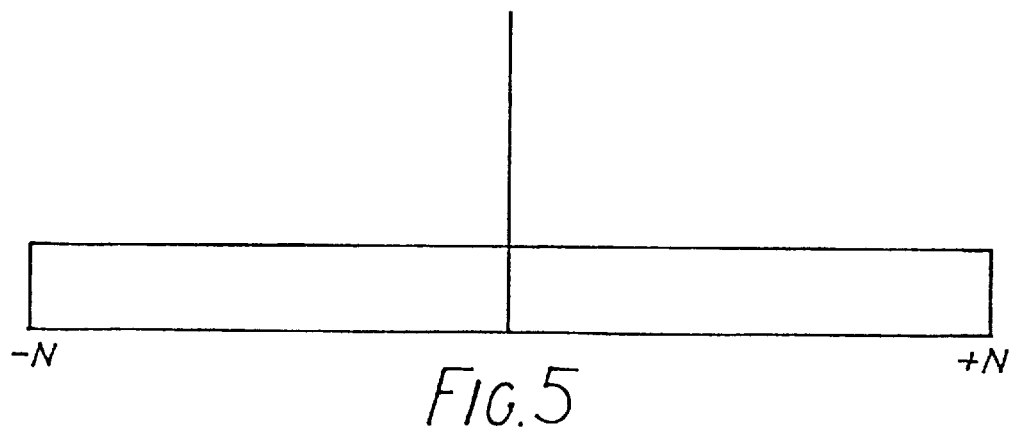
Figure 6:
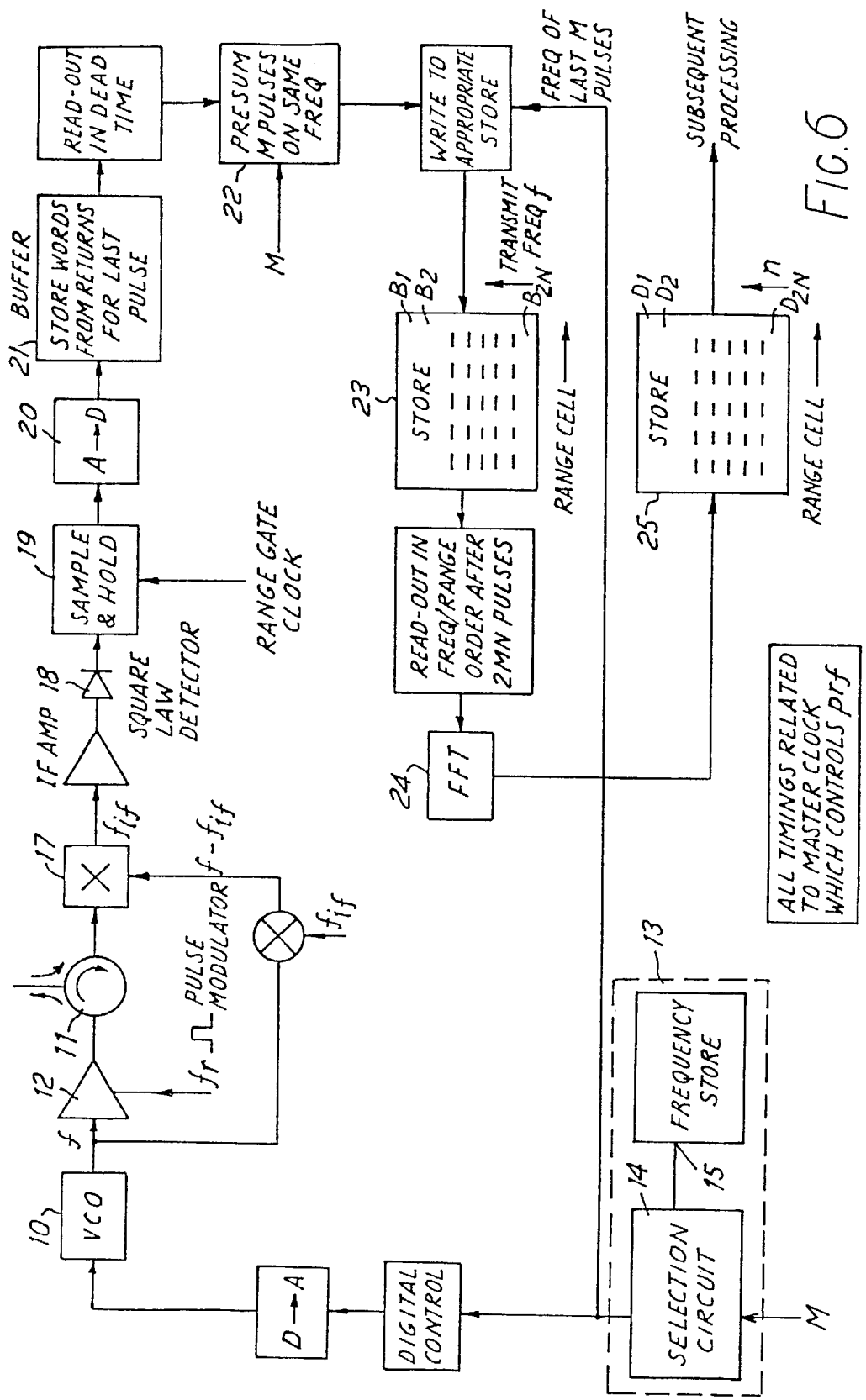
Figure 7:
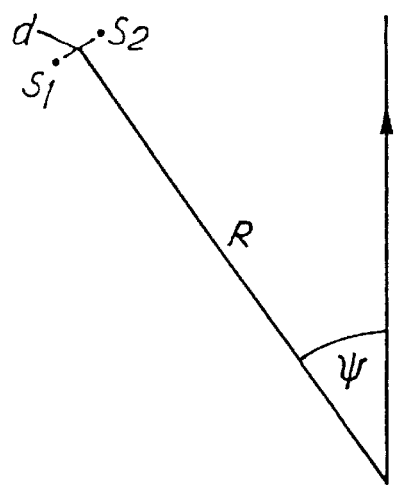
Figure 8:
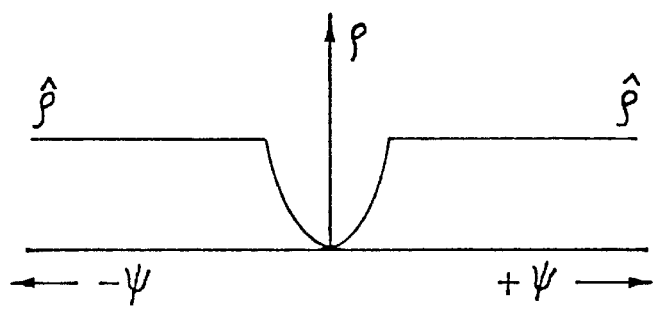
Figure 9A:
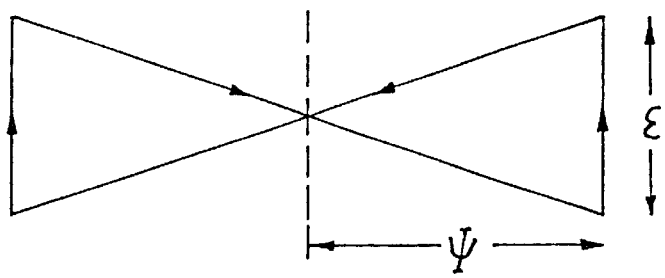
Figure 9B:
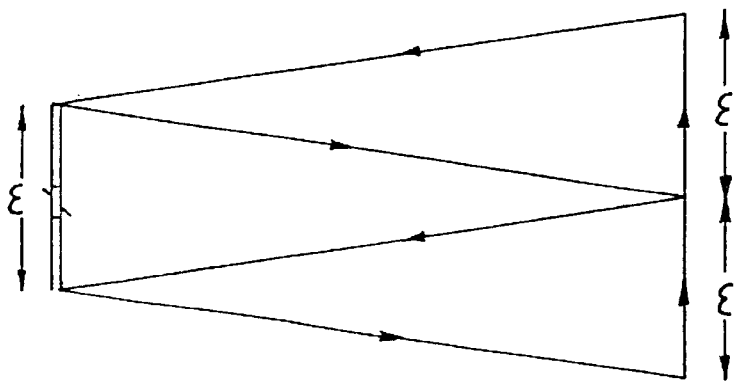

In order that the invention may be carried readily into effect specific embodiments thereof are now described, by way of example only, by reference to the accompanying drawings of which FIG. 1 shows a step-wise variation of transmission frequency as a function of time, FIG. 2 illustrates a variation with frequency in the power detected at a radar receiver, FIG. 3 shows a mapping of a pair of scatterers in the differential range domain, FIGS. 4a, and b, show respectively idealised representations of pure spectra for clutter and target scatterers, FIG. 4c shows the pure spectrum for a point target scatterer, FIG. 4d shows an idealised representation of a hybrid spectrum derived from a point target scatterer and a distributed assembly of clutter scatterers, FIG. 5 shows the hybrid spectrum after "whitening", FIG. 6 shows a radar in block schematic form, FIG. 7 shows an antenna beam scanned in azimuth, FIG. 8 shows how an improvement in signal-to-clutter ratio $\hat{\rho}$ varies as a function of azimuthal scan angle $\psi$, and FIGS. 9a and 9b show alternative scanning patterns.

In one application, it is intended that a radar in accordance with the present invention will be carried by an airborne vehicle—for example a terminally-guided sub-munition (TGSM) operating in search and tracking modes to respectively detect, and home on to, targets such as tanks or trucks deployed on the ground.

The radar is designed to exploit the different spatial dispositions and extensions of scatterers comprising target and clutter respectively, within the region illuminated by a radar pulse. To this end, the radar exploits an effect which can be understood by considering first, a simplified example in which a non-coherent radar illuminates a pair of scatterers spaced apart from one another, down range by a distance r, hereinafter referred to as differential range, The radar frequency f is swept, in stepwise manner, over a frequency range F, the frequency of 2N successive batches of M pulses being incremented in steps of $$\delta f = \frac{F}{2N},$$

as illustrated in FIG. 1.

As the frequency is swept in this manner, so the relative phases of returns from the two scatterers will change causing an oscillatory variation with frequency in the power of the pulse returns from the scatterers detected at the receiver, as shown in FIG. 2. A frequency analysis of returns, for example a Discrete Fourier Transform (DFT) of returns, produces a mapping of the pair into 2N cells in the differential range domain. Thus, in the described example, a "line" is produced in cells $\pm n_r$ corresponding to the differential range r, as shown in FIG. 3, and the $\pm N^{th}$ cells correspond to the maximum resolvable differential range R which is related to the bandwidth B of the radar by the expression $$R = \frac{c}{2B} \qquad \text{Eq. 1}$$

where c is the speed of light.

In general targets or clutter consist of a distributed assembly of scatterers and produce a distribution of energy in the differential range domain, hereinafter referred to as a spectrum. The spectrum derived from clutter, whose scatterers are assumed to be spread uniformly across the whole of the patch illuminated by the radar pulse, will be relatively broad, as shown in FIG. 4a, whereas a target (e.g. a tank or truck) being confined to a relatively small region of space will produce a narrower spectrum of the form shown in FIG. 4b. It will be appreciated that the output from the DFT will consist of 2N samples although for convenience the envelopes of the spectra are drawn as being continuous. These spectra, which are referred to hereinafter as pure spectra, are produced by returns from many pairs of scatterers, each pair consisting respectively of two target scatterers or two clutter scatterers. It is also possible, however, to obtain a hybrid spectrum due to pairs, each consisting of one target scatterer and one clutter scatterer. The individual clutter in these various spectra will consist of returns from multiple pairs of scatterers having a spread of differential ranges, this spread being approximately, $$\frac{c}{2F},$$

the differential range resolution of the system.

A hybrid spectrum may be understood by considering first the effect of returns from a stationary point target scatterer interfering with returns from an assembly of clutter scatterers, distributed uniformly across the range cell. In these circumstances the pure spectrum, due to the target scatterer, has the form shown in FIG. 4c whereas the pure spectrum, due to the clutter scatterer, has the form shown in FIG. 4a.

If the range differential between the target scatterer and the nearer edge (to the target) of the range cell corresponds to the $n_n^{th}$ cell in the hybrid spectrum and the range differential between the target scatterer and the further edge of the range cell corresponds to the $n_f^{th}$ cell in the hybrid spectrum, so that $n_n \leq n_f$, then for a point target scatterer the hybrid spectrum will be of the form shown in FIG. 4d. In general, the hybrid spectrum for an extended target will be more complex.

In practice, an observed spectrum will generally comprise a mixture of both pure and hybrid spectra and an individual line may include contributions from different pair combinations i.e. target/target; clutter/clutter; clutter/target.

It will be appreciated that the spectra derived in this way represent, in effect, the autocorrelation function of the distribution in range of the individual scatterers illuminated by the radar.

The two spectral lines shown in FIG. 3 are shown as being identical for positive and negative values of differential range. This will also be true for radar returns processed as described so far and so the spectra shown in FIG. 4 are shown as symmetrical about the centre line (zero differential range).

However, it is also known that this technique can be applied to tracking radars and through the use of a monopulse antenna feeding a one or two dimensional monopulse antenna feed in conjunction with the processing of quadrature phase r.f. signals it is found that the monopulse difference channel (hereinafter referred to as the Δ channel) naturally provides lines that are in general of different amplitudes in cells $+n_r$ and $-n_r$ respectively. The angular offsets from the monopulse antenna boresight of principle scatterers within the patch illuminated by a radar pulse can be obtained from the ratio of the line amplitudes in the monopulse difference channel and the equivalent line amplitudes in the monopulse sum channel (hereinafter referred to as the Σ channel). Details of this process are not relevant to the invention described herein insofar as the present embodiments are concerned with manipulating the spectra rather than improvements to the basic tracking technique.

In practice it is likely that a target will be moving with respect to the clutter with a relative velocity which has a component in the direction of the radar. Although the pure spectra remain unchanged in these circumstances, the hybrid spectrum may undergo a modification.

If, for example, a point target scatterer is moving up or down range with a relative velocity v then during a time interval T, taken to sweep the frequency f across a frequency range F, the differential range of a pair of scatterers contributing to the hybrid spectrum will change by an amount +VT or −VT, depending on the sense of the relative movement.

Over the period of the sweep the relative phases of returns from this pair will change by an amount $$\phi = \frac{4\pi Tv}{c}\left(f + \frac{F}{2}\right)$$

and since, in general, P<<f $$\phi = \frac{4\pi fTv}{c} \qquad \text{Eq 2}$$

The effect of target motion in the range direction is that a target scatterer will approach some clutter scatterers within the range cell and recede from others. In these circumstances, components of lines in cells below $n_n$ will split; those components due to up-range clutter scatterers moving in one sense along the differential range axis of the spectrum and those components due to down-range clutter scatterers moving in the opposite sense. In contrast, components of those lines in cells between $n_n$ and $n_f$ are caused to shift in the same sense, depending on the direction of relative target motion. A critical velocity $$v_c = \frac{cF}{fBT},$$

corresponding to a phase change of 4N π can be found which leaves the spectrum in the original (v=0) position, as shown in FIG. 4d.

At intermediate velocities the hybrid spectrum will, in general, be smeared. The variation in the shape of the hybrid spectrum is described in more detail in our copending British Application No. 8517564.

Even if returns from clutter scatterers are weak as compared with returns from target scatterers the hybrid spectrum may still influence significantly the shape of the composite spectrum which contains contributions from both the pure and hybrid spectra. In some applications the composite spectrum is used for the detection and identification of targets in a clutter background. The variability of the hybrid spectrum with relative target velocity, v, may tend to hinder detection of a target. The inventor has discovered that this variability can be reduced by transmitting the 2 NM pulses in accordance with a succession of monotonic sequences of frequencies, the returns being then reordered in accordance with a single monotonic frequency sequence, prior to frequency analysis. The form of the pure spectra will be preserved; however, provided the relative velocity of the target and clutter scatterers has at least the value $$\delta v\left(=\frac{c}{2fT}\right)$$

corresponding to a phase change ϕ(=2π), necessary to resolve a shift in the position of a spectral line, the effect of the sequencing is to "whiten" the hybrid spectrum as illustrated in FIG. 5 and to reduce its influence in the composite spectrum. Thus, if T=12.8 ms and f=94 GHz, "whitening" will occur for relative velocities in excess of ±0.125 ms. It will be appreciated that since the spectra are generated on the basis of limited sampling, the individual lines contributing to the nominally flat hybrid spectrum produced by the sequencing procedure will be subject to fluctuations about a constant mean. Use of a suitable selection of monotonic sequences, however, may reduce such fluctuations.

FIG. 6 shows one implementation of the above described procedure. The system shown includes a variable control oscillator 10 coupled to a duplexer 11 via a pulse modulation circuit 12. The oscillator receives a control voltage $V_f$ derived from a control circuit 13 effective to select an appropriate frequency for transmission.

During each transmission cycle the duplexer transmits a total of M(eg. 16) pulses at each of 2N (eg. 16) stepped frequencies ($f_1$, $f_2$ $f_3$ . . . $f_{2N}$), control circuit 13 being conditioned to select frequencies for transmission in accordance with a desired succession of monotonic frequencies of which the following are examples only:

(a) A first monotonic sequence (I) comprises alternate frequencies $f_1$, $f_3$ . . . $f_{2N-1}$ and a second monotonic sequence (II) comprises the remaining frequencies $f_2$, $f_4$ . . . $f_{2N}$.

These interleaved sequences (I) and (II) may be repeated, alternately M times until a total of 2 NM pulses has been transmitted. Alternatively, M pulses could be transmitted in succession at each of the 2N frequencies or, in a further example, each of the sequences (I)and (II) could be transmitted M times in succession.

(b) Three interleaved sequences could be used, a first sequence (I) comprising the frequencies:

$f_1$, $f_4$ . . . $f_{2N}$, a second sequence (II) comprising the frequencies $f_3$, $f_6$ . . . $f_{2N-1}$, and a third sequence (III) comprising the frequencies $f_2$, $f_5$ . . . $f_{2N-2}$ Again, the batch of sequences I, II and III may be repeated, in any order, times until a total of 2 NM pulses has been transmitted or, as before, M pulses could be transmitted in succession at each of the 2N frequencies, or each of the sequences I, II and III could be transmitted M times in succession.

(c) Four (or more) interleaved sequences are also possible and again pulses may be transmitted in the manner described in relation to examples (a) and (b) above. In the case of four interleaved sequences, the first sequence (I) comprises the frequencies $f_1$, $f_5$ . . . $f_{2N-3}$, the second sequence (II) comprises frequencies:

$f_2$, $f_6$ . . . $f_{2N-2}$ the third sequence (III) comprises frequencies:

$f_3$, $f_7$ . . . $f_{2N-1}$ and the fourth sequence (IV) comprises frequencies:

$f_4$, $f_8$ . . . $f_{2N}$

The sequences described in examples (a), (b)and (c) above ay be arranged in ascending or descending order or as a mixture of both.

Moreover, it will be appreciated that other monotonic sequencing formats could be adopted; for example, the sequences described in (a), (b) and (c) above could be used in combination.

Typically, control circuit 13 comprises a selection circuit 14 conditioned to select frequencies, in accordance with a desired sequencing format, from a frequency store 15.

Returns received in response to each transmitted pulse are combined in a mixing circuit 17 with a local oscillator signal thereby to generate a signal at IF. This IF signal is then passed to a square law detector 18 and, after range gating in a sample and hold circuit 19, fed via an analogue-to-digital conversion circuit 20 to a buffer store 21. Returns are presummed in circuit 22 and a distribution circuit, which is controlled by the frequency f of the last pulse, routes returns, in range order, to a respective frequency bin $B_1$, $B_2$ . . . $B_{2N}$ of a multichannel store 23.

The contents of the 2N frequency bins are then passed, in accordance with a monotonic frequency sequence, to a transformation circuit 24 for each range cell in turn. The transformation circuit carries out a Fast Fourier Transform on each set of 2N signals and generates respective sets of 2N transformation signals, one set for each range cell. The 2N transformation signals form the components of a spectrum in the differential range domain and are stored in respective bins $D_1$, $D_2$ . . . $D_{2N}$ of a further store 25 for further analysis. To assist in detection of a target suitable threshold levels may be set to monitor one or more selected channels.

A circuit (not shown) could also be provided to reduce the effect of the "white" part of the spectrum. This may simply involve reducing the content of each channel in the observed spectrum by the content in the channel having the smallest output, or preferably by setting a detection threshold derived by averaging levels in the upper part of the spectrum, where the pure clutter spectrum is relatively insignificant. At the same time, the standard deviation of the "white" spectrum could be obtained and, if required, this could be weighted and added to the average to obtain the threshold.

In another application the target may not be moving with respect to the clutter but, as in the case of a airborne radar operating in a search mode, the antenna beam may be scanned in azimuth to illuminate areas to either side of the line of travel of the airborne vehicle. The effect of this, when observing scatterers to either side of the line of travel, will be to induce an apparent movement of one of the scatterers in a pair with respect to the other, as perceived at the radar.

If, for example, as is represented in FIG. 7, the radar is moving on a horizontal track at a velocity V and at a particular azimuthal scan angle $\psi$ the antenna beam, assumed to have a negligible depression angle, illuminates a pair of scatterers $S_1$, $S_2$ at a range R and having a cross-range separation d, the induced relative velocity $v_i$ of the scatterers towards the radar will be given by the expression $$v_i = \frac{Vd}{R} \sin\psi \quad \text{Eq 3}$$

The corresponding spectral line will undergo a shift provided that $$v_i \geq \delta v = \frac{c}{2fT} \quad \text{Eq 4}$$

Thus, combining equations 3 and 4, an induced velocity $v_i$ will affect lines in both the pure and hybrid spectra provided the corresponding pairs of scatterers have a cross range separation $$d \geq \tilde{d} = \frac{cR}{2fTv\sin\psi} \quad \text{Eq 5}$$

In some operational circumstances, particularly if the clutter returns are relatively weak as compared with the target returns, the frequency sequencing technique, described hereinbefore, can be used to exploit the effect of induced velocity.

If the azimuthal beam width of the radar antenna is $\alpha$, returns will be received from pairs of scatterers having a cross-range separation of up to R$\alpha$. However, if d is set so as to be equal the maximum possible cross-range dimension D of a target, the pure spectrum, due to target scatterers only, will be unaffected by the sequencing procedure, whereas the pure spectrum due to clutter scatterers only will be subject to some "whitening". Since the probability of possible pairings decreases as a function of differential range r, as shown in FIG. 4a, the effect of the sequencing procedure is to reduce the power in the spectrum by a factor $$\hat{\rho} = \frac{R\lambda}{2D}$$

producing a improvement in the signal-to-clutter ratio.

If d is to be retained at the chosen value D the frequency period T, given by $$\frac{cR}{2fDV\sin\psi}$$

needs to be adjusted as the scan angle $\psi$ changes.

Thus if R=1 km, f=94 GHz, D=4 m and V=150 ms$^{-1}$ then at a scan angle $\psi=\pm15°$ the sweep period T is 12.8 ms and $\hat{\rho}$ is 8 dB and at a scan angle $\psi=\pm30°$ the sweep period T is 6.4 ms. However, the sweep period should not exceed the dwell time of the beam and so as $\psi$ approaches 0° the improvement $\hat{\rho}$ in signal-to-clutter ratio will approach 0 dB, as shown in FIG. 8.

If the elevation beam width $\epsilon$ equals the azimuth beam width the scanning pattern shown in FIG. 9a can be adopted to ensure that successively scanned swathes on the ground are contiguous. Adopting this approach, the beam elevation is advanced by an amount $\epsilon$ at the limit $\overline{\psi}$ of each scan and is progressively decreased, by $\epsilon$, during the next scan.

If the height of the radar above the ground is H the scan period for successive clockwise and anticlockwise scans will be $$\gamma = \frac{2R^2}{VH}\varepsilon$$

and if each swathe on the ground has a width S the maximum scan angle $\overline{\psi}$ given by the expression $$\Phi = \sin^{-1}\left(\frac{S}{2R}\right).$$

It then follows that the azimuthal dwell time of the antenna beam is $$\frac{\lambda\tau}{2\Phi}$$

and so the benefit of the sequencing procedure can be exploited only for scan angles $$\psi \geq \breve{\psi} = \sin^{-1}\left(\frac{cR\Phi}{\lambda fDv}\right)$$

Thus, a central portion of each swathe, having a width $$2R\sin\breve{\psi} = \frac{2cR^2}{fDV\lambda},$$

will yield a reduced value of $\hat{\rho}$, the proportion z of the swathe for which $\hat{\rho}$ is at a maximum being given by the expression $$z = 1 - \frac{2R\sin\breve{\psi}}{S} = 1 - \frac{cR}{\lambda fDV}$$

Thus if R=800 m, $\beta$=50 mrad, f=94 GHz, D=4 m and V=150 ms$^{-1}$ then z=91% and the central portion of the swathe, which does not yield the maximum improvement, will be about 54 m wide.

An alternative scanning pattern, shown in FIG. 9b, can be adopted to ensure that the antenna beam illuminates the same points on the ground during two successive scans. To this end, the elevation angle is increased by $\epsilon$ at one end of the scan and is alternately increased or decreased, by $\epsilon$, at the other end. In this case the proportion z' of each swathe for which $\hat{\rho}$ is not at a maximum is given by the expression $$z' = 1 - \frac{2cR}{fDV},$$

and taking the same example as before has a value 82%.

If the signal-to-noise ratio permits, it would be possible to achieve some increase in the value of z by modulating the azimuthal scan velocity thereby to slow down the scan rate in the central portion of the scan.

Finally it will be understood that the techniques described herein are not restricted to radars operating with a fixed or single antenna polarisation. Several spectra may be generated simultaneously or sequentially using co-polar and cross-polar responses from scatterers and the techniques described herein may be used to exploit the effects of scatterer motion in any or all of these spectra.

What is claimed is:

1. A non-coherent pulsed radar comprising means for transmitting none-coherent radar pulses in successive groups and for receiving corresponding returns, the pulses in each group being transmitted in accordance with a respective monotonic sequence of frequencies, each said sequence being different from at least one other sequence, transformation means to derive from said returns a plurality of transformation signals representing a distribution of pairs of scatterers, which comprise target and or clutter, as a function of their differential range, means to order said returns in accordance with a single monotonic sequence of said transmitted frequencies before they are passed to said transformation means, and comparison means for comparing the power in a selected one or a selected group of differential range cells with a threshold value thereby to enable detection of a target.

2. A radar according to claim 1, comprising means to interleave the frequencies in each said sequence with the frequencies in another said sequence.

3. A radar according to claim 1, comprising means to interleave the frequencies in each said sequence with the frequencies in the immediately preceding and or succeeding sequence.

4. A radar according to claim 1, comprising means to repeat a batch of interleaved sequences, containing 2N frequencies, a number of times, M, there being a total of 2 NM transmitted pulses.

5. A radar according to claim 1, comprising means to transmit each frequency a predetermined number of times in succession.

6. A radar according to claims 1 comprising means to transmit each sequence a predetermined number of times in succession.

7. A radar according to claim 1, wherein the frequencies from which the sequences are constituted are evenly spaced.

8. A radar according to claim 1 wherein the monotonic sequences are increasing or decreasing sequences or a mixture of both.

* * * * *